US012556554B2

United States Patent
Arlitt et al.

(10) Patent No.: US 12,556,554 B2
(45) Date of Patent: Feb. 17, 2026

(54) GRAPHICAL DISPLAY OF PLOT OF BINS OVER WHICH ITEMS REPRESENTED WITHIN LOG EVENTS HAVING A POWER LAW-ORIENTED DISTRIBUTION ARE ORGANIZED

(71) Applicant: MICRO FOCUS LLC, Santa Clara, CA (US)

(72) Inventors: Martin Fraser Arlitt, Calgary (CA); Manish Marwah, Santa Clara, CA (US); Mark Kendall Vaszary, Fort Collins, CO (US)

(73) Assignee: Micro Focus LLC, Santa Clara, CA (US)

( * ) Notice: Subject to any disclaimer, the term of this patent is extended or adjusted under 35 U.S.C. 154(b) by 573 days.

(21) Appl. No.: 17/731,720

(22) Filed: Apr. 28, 2022

(65) Prior Publication Data

US 2023/0353586 A1 Nov. 2, 2023

(51) Int. Cl.
*H04L 9/40* (2022.01)
*G06T 11/20* (2006.01)

(52) U.S. Cl.
CPC ........ *H04L 63/1425* (2013.01); *G06T 11/206* (2013.01); *H04L 63/205* (2013.01)

(58) Field of Classification Search
CPC .. H04L 63/1425; H04L 63/205; G06T 11/206
See application file for complete search history.

(56) References Cited

U.S. PATENT DOCUMENTS

| 11,321,885 | B1 * | 5/2022 | Du | G06T 11/206 |
| 11,843,622 | B1 * | 12/2023 | Tellez | H04L 63/1425 |
| 2018/0343272 | A1 * | 11/2018 | Khalil | G06F 21/56 |
| 2019/0158520 | A1 * | 5/2019 | DiValentin | H04L 63/145 |
| 2019/0289029 | A1 * | 9/2019 | Chawla | H04L 63/1425 |
| 2021/0320946 | A1 * | 10/2021 | Boshmaf | H04L 63/0823 |

OTHER PUBLICATIONS

Mahanti, A. et al., "A Tale of the Tails: Power-laws in Internet Measurements", IEEE Network, vol. 27, No. 1, pp. 59-64. Jan.-Feb. 2013.

* cited by examiner

*Primary Examiner* — Cheng-Feng Huang
(74) *Attorney, Agent, or Firm* — Sheridan Ross P.C.

(57) ABSTRACT

For each item represented within log events that have a power law-oriented distribution, first and second metrics for the item are computed based on the log events which pertain to the item. The items are organized over bins according to the first metric. The bins correspond to different ranges of the first metric. For each bin, the items in the bin are ordered according to the second metric. A plot of the bins over which the items have been organized according to the first metric, is graphically displayed, which includes displaying, for each bin, the items in the bin as have been ordered according to the second metric.

13 Claims, 8 Drawing Sheets

GRAPHICAL DISPLAY OF PLOT OF BINS OVER WHICH ITEMS REPRESENTED WITHIN LOG EVENTS HAVING A POWER LAW-ORIENTED DISTRIBUTION ARE ORGANIZED

BACKGROUND

A significant if not the vast majority of computing devices are globally connected to one another via the Internet. While such interconnectedness has resulted in services and functionality almost unimaginable in the pre-Internet world, not all the effects of the Internet have been positive. A downside, for instance, to having a computing device potentially reachable from nearly any other device around the world is the computing device's susceptibility to malicious cyber attacks that likewise were unimaginable decades ago. Additionally, in an enterprise or other organization having large numbers of such computing devices, the devices have to be properly configured in order for them to optimally communicate with other devices over the Internet and other networks.

DETAILED DESCRIPTION

Figure 1A:
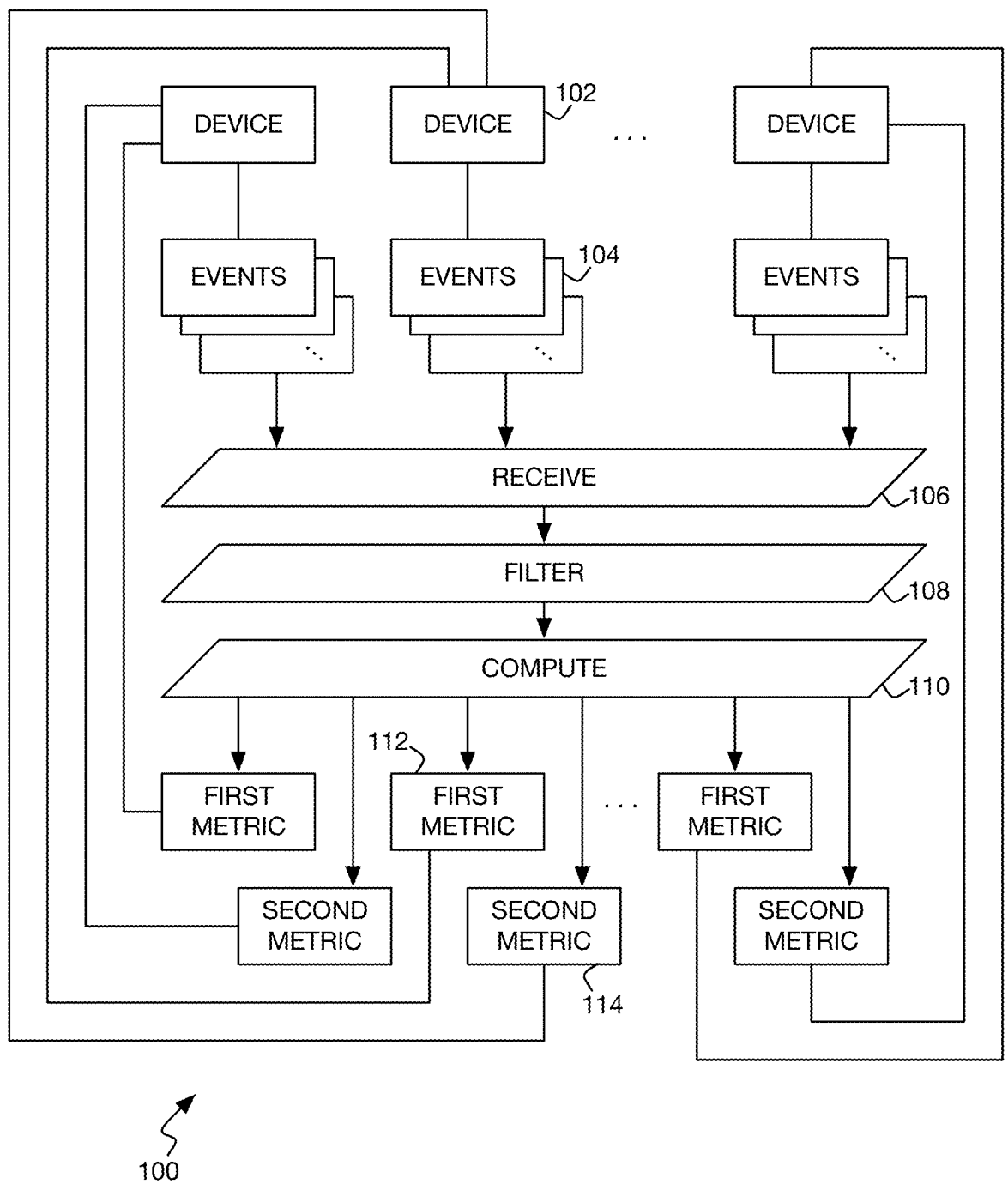
FIGS. 1A and 1B are diagrams of an example process for generating a plot of bins over which devices represented within log events having a power law-oriented distribution are organized.

As noted in the background, a large percentage of the world's computing devices can communicate with one another over the Internet, which is generally advantageous. Computing devices like servers, for example, can provide diverse services, including email, remote computing device access, electronic commerce, financial account access, and so on. However, providing such a service can expose a server computing device to cyber attacks, particularly if the software underlying the services has security vulnerabilities that a nefarious party can leverage to cause the application to perform unintended functionality and/or to access the underlying server computing device.

Individual servers and other devices, including other network devices and computing devices other than server computing devices, may output log events indicating status and other information regarding their hardware, software, and communication. Such communication can include intra-device and inter-device communication as well as intra-network (i.e., between devices on the same network) and inter-network (i.e., between devices on different networks, such as devices connected to one another over the Internet) communication. The terminology log event is used generally herein, and encompasses all types of data that such devices, or hosts or sources, may output. For example, such data that is encompassed under the rubric of log events includes that which may be referred to as messages, as well as that which may be stored in databases or files of various formats.

To detect potential security vulnerabilities and potential cyber attacks by nefarious parties, as well as to detect other types of anomalies, such as device misconfiguration and operational and/or business issues, voluminous amounts of data in the form of such log events may therefore be collected, and then analyzed in an offline or online manner to identify such anomalies. An enterprise or other large organization may have a large number of servers and other devices that output log events. The log events may be consolidated so that they can be analyzed en masse. Some anomalies, for instance, may be more easily detected or may only be able to be detected by analyzing interrelationships among the log entries of multiple devices, or sources. Analyzing the log events of just one computing device may not permit such anomalies to be detected.

Techniques described herein provide for a way to visualize log events from multiple devices so that anomalies, including anomalous devices and events, can be identified. The techniques novelly leverage the insight that such log events generally have a power law-oriented distribution. A power law is a functional relationship between two quantities, where a relative change in one results in a proportional relative change in the other independent of the initial size of the quantities. That is, a power law relationship can be defined as $y=x^\alpha$, where a can be a whole number or fractional, and can be positive or number. The relationship between $\log(y)$ and $\log(x)$ is linear.

While log events may not have strict compliance with power law properties, the log events nevertheless have skewed non-uniform distributions that loosely abide to a formulation of a Pareto principle. That is, 20% of the log events may pertain to 80% of the anomalous behavior per the "80/20 rule"; 10% of the log events may pertain to 90% of the anomalous behavior per the "90/10 rule"; 1% of the log events may pertain to 99% of the anomalous behavior per the "99/1 rule"; and so on. In these respects, then, it is said that the log events have a power law-oriented distribution.

Specifically, in the techniques described herein, for each device represented within log events having a power law-oriented distribution, first and second metrics are computed from the log events. The devices are organized over bins according to the first metric, with each bin corresponding to a different range of the first metric. Then, for each bin, the devices are ordered according to the second metric. A plot of the bins over which the devices have been organized according to the first metric is graphically displayed, where in each bin the devices are displayed in order of the second metric.

Such a graphical plot of the devices has been shown to provide for easier visual identification of devices having anomalies as compared to other types of graphical plots generated from log events having a power law-oriented distribution. The initial organization of the devices over bins permits similar types of devices (by virtue of their being in the same bin) to be visually compared with one another. The resulting ordering of the devices in each bin then permits anomalous devices in a given bin to be more easily identified. By comparison, other types of graphical plots, such as a log-log rank/frequency plot that leverages Zipf's law, permit far fewer anomalous devices to be identified.

As a concrete example, the devices may be network server hosts. The first metric may be the percentage of log events that are related to domain name system (DNS) requests or responses, and the second metric may be the average DNS event rate per second. Server hosts having the same general percentages of DNS events (e.g., 0-10%, 10-20%, and so on, in the case in which there are ten bins) can be easily visually compared with one another to identify any hosts that have anomalous behavior as to their DNS event rates.

It is noted that the number of and amount of data contained within log events are substantially voluminous for even a small network of computing and other devices, and can exponentially increase with larger networks such as a typical enterprise network. There is no practical way such amounts of information can be manually inspected to identify the types of inconsistency that the disclosed techniques do for anomaly detection. Moreover, it would be arduously time-consuming to perform the disclosed techniques on an even limited set of data representing a small timeframe of collected log events, rendering them ineffective to actually detect anomalies in a way that such detection could be actually used.

The techniques are further described in relation to devices represented within log events. However, more generally, the techniques pertain to log events in which items are represented. The items may be devices, users, entities, and so on. For instance, as to users in particular, the events may be indicative of activity related to users, such as logins, logouts, password changes, password change attempts, and so on. The described techniques can thus be more generally applied to log events within which any such items are represented to identify anomalies, including anomalous items and events.

Figure 1B:
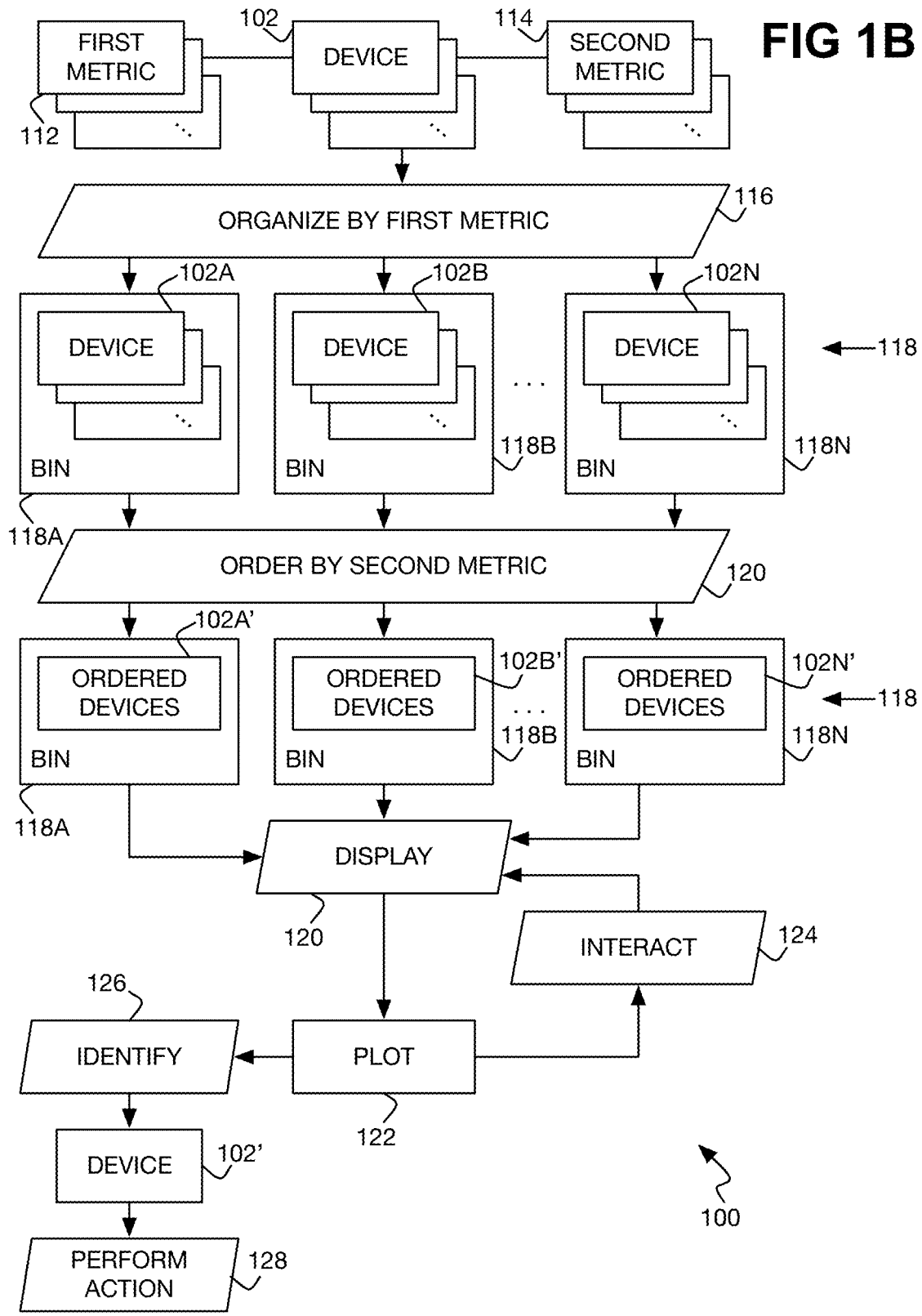

FIGS. 1A and 1B show an example process 100 for generating a plot of bins over which devices represented within log events having a power law-oriented distribution are organized. The process 100 may be implemented as program code stored on a non-transitory computer-readable data storage medium, such as a memory, and expected by a processor of a computing device, which may be other than the devices represented within the log events, to perform processing. The process 100 is performed when a request to generate and display the plot is received.

Referring first to FIG. 1A, each of a number of devices 102 is represented within multiple log events 104. That is, there are a number of log events 104 for each device 102. As depicted in the figure, each log event 104 pertains to just one device 102. However, in actuality, a given log event 104 may pertain to more than one device 102.

The log events 104 within which the devices 102 are represented are received (106). The log events 104 may be received in realtime as they are generated, en masse, or periodically in groups of log events 104. The log events 104 may first be filtered (108) to limit the devices 102 that are ultimately denoted within the generated plot to a subset of all the devices 102 that are represented within the events 104. The log events 104 may be filtered by properties such as network addresses, transport protocol, application protocol, ethertype, port numbers, size in bytes, and so on.

From the resulting log events 104, a first metric 112 and a second metric 114 is computed for each device 102 (110). That is, the first metric 112 and the second metric 114 for a device 102 are calculated based on or from the log events 104 that pertain to the device 102. Each device 102 therefore has its own value for the first metric 112 and its own value for the second metric 114.

Referring next to FIG. 1B, the devices 102 are organized (116) over bins 118A, 118B, . . . , 118N, which are collectively referred to as the bins 118, according to the first metric 112. Each bin 118 corresponds to a different range of the first metric. For example, if the first metric 112 is a percentage, there may be ten bins 118, corresponding to 0-10%, 10-20%, 20-30%, and so on. The ranges may be equal in size to one another, or different.

The bin 118A therefore includes the devices 102A that have values for the first metric 112 within the first metric range to which the bin 118A corresponds. The bin 118B similarly includes the devices 102B that have values for the first metric 112 within the first metric range to which the bin 118B corresponds, and so on, such that the bin 118N includes the devices 102N having values for the first metric 112 within the first metric range to which the bin 118N corresponds.

Within each bin 118, the devices 102 within that bin 118 are then ordered (120), or ranked, according to the second metric 114. As one example, the devices 102 within a bin 118 may be ranked from the largest (or smallest) value of the second metric 114 to the smallest (or largest) value of the second metric 114. The devices 102A within the bin 118A as so ordered are indicated as the ordered devices 102A'; the devices 102B within the bin 118B as so ordered are indicated as the ordered devices 102B'; and so on, with the devices 102N within the bin 118N as so ordered being indicated as the ordered devices 102N'.

A plot 122 of the bins 118 over which the devices 102 have been organized according to the first metric 112 is then graphically displayed (120), including the display of the devices 102 in each bin 118 as have been ordered according to the second metric 114. Once the plot 122 has been graphically displayed, a user may interact (124) with the plot 122 to glean information regarding the devices 102 displayed within the plot 122, as well as to adjust the plot 122 to zoom in on areas of interest. Specific examples of such user example are described later in the detailed description.

The plot 122 is thus generated on the basis of a first metric 112 and a second metric 114 calculated for each device 102. However, the described techniques can be extended to use more than two metrics 112 and 114 to generate the plot 122, such as by using an additional third metric, in which case the plot 122 is a three-dimensional (3D) plot. As another example, more than two metrics 112 and 114 may be used to generate the plot 122 by considering them pairwise.

An anomalous device 102' may be identified (126) within the plot 122. Such identification can include manual user selection within the plot 122 of the device 102' having an anomaly. In another implementation, the device 102' may be identified in an automated manner. For example, the devices 102 as have been organized in bins 118 by the first metric 112 and ordered in each bin 118 by the second metric 114 may be subjected to machine learning models that detect anomalous behavior. The techniques described herein can thus supplement existing such machine learning models.

Once an anomalous device 102' has been identified, an action may be performed in relation to the device 102' (128). For example, the device 102' may be reconfigured if the anomalous behavior of the device 102' resulted from a misconfiguration. The device 102' may be reset or restarted. If the anomalous behavior of the device 102' is due to a cyberattack, security measures may be automatically put into place on the network including the device 102' to defend against the attack. If the anomalous behavior results from a security vulnerability of the device 102', the device 102' may be removed from service, turned off, or patched to resolve the vulnerability.

Figure 2:
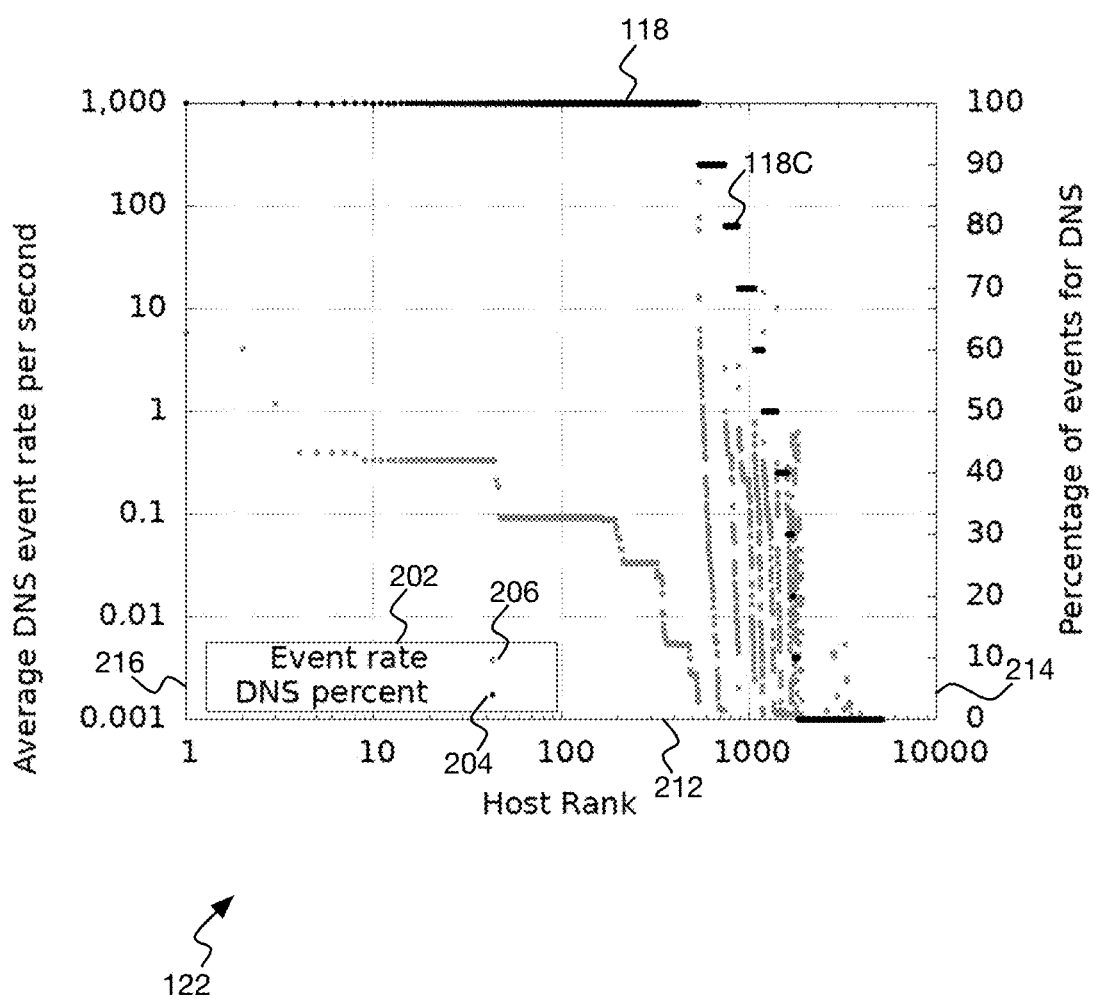
FIG. 2 is a diagram of an example plot of bins over which devices represented within log events having a power law-oriented distribution are organized.

FIG. 2 shows an example plot 122 that can be generated in the process 100 of FIGS. 1A and 1B. In the plot 122, the first metric 112 is specifically the percentage of log events 104 pertaining to a device 102 that are DNS events. The second metric 114 is specifically the average rate of such log events 104 pertaining to a device 102 that are DNS events. Per the legend 202, each device 102 is denoted in two ways in the plot 122: by DNS event percentage (i.e., the first metric 112), as dark points 204; and by DNS event rate (i.e., the second metric 114), as light points 206.

The devices 102 are thus displayed by their dark points 204 over the bins 118 according to which they have been organized by the first metric 112. One particular bin 118C is identified for reference purposes later. The bins 118 are plotted along the x-axis 212, which is logarithmic in scale, in order of the different ranges of the first metric 112 to which the bins 118 correspond, from greatest to least. The bins 118 are further plotted along the (right-hand) y-axis 214, which is not logarithmic in scale, according to representative values of the different ranges of the first metric 112 to which the bins 118 correspond. The representative value of a given range may be the minimum or maximum value of that range, the mid-point value between the minimum and maximum values, or any other representative value, for instance. In the example, there are specifically eleven bins 118 respectively corresponding to eleven ranges: 0%, (0%, 10%], (10%, 20%], (20%, 30%], . . . , (90%, 100%]. In each range, the first value is preceded by "C to include that the first value is not part of the range, and the second value is preceded by 1" to indicate that the second value is part of the range.

The left-most bin 118 specifically corresponds to the range of 90-100%, and has a representative value of 100%. Each device 102 within this bin 118 is represented by a dark point 204 having a value along the x-axis 212 corresponding to the order or rank of the device 102 in that bin 118, but having a value along the y-axis 214 as the representative value of 100%. The next bin 118 (to the right of the left-most bin 118) corresponds to the range of 80-90%, and has a representative value of 90%. Similarly, each device 102 within this bin 108 is represented by a dark point 204 having a value along the x-axis 212 corresponding to the order or rank of the device 102 in that bin 118, but having a value along the y-axis 214 as the representative value of 90%. It is noted that the right-most bin 118 is a special case, and corresponds to the range of 0%, with a representative value of 0%. By comparison, the next bin 118 (to the left of the right-most bin 118) corresponds to the range of 0-10%, and has a representative value of 10%.

Within each bin 118, the devices 102 are displayed by their light points 206. The devices 102 are plotted along the x-axis 212, which is the same x-axis 212 along which the devices 202 are displayed by their dark points 204 over the bins 118 and thus as noted above is logarithmic in scale, according to their order or rank by the second metric 114 (from highest value of the second metric 114 to lowest value of the second metric 114). The label of the x-axis 212 in FIG. 2 denotes such host rank. Each device 102 specifically has a unique order rank, such that the orders or ranks increase from the left-most bin 118 to the right-most bin 118 in the plot 122. Each device 102 within each bin 118 is therefore represented by a light point 206 having a value along the x-axis 212 corresponding to the order or rank of the device 102 in its bin 118, and having a value along the (left-hand) y-axis 216, which is logarithmic in scale, equal to its value for the second metric 114.

The plot 122 provides for easier identification of devices 102 that have anomalies. The devices 102 within the left-most bin 118, and thus which have a DNS event percentage (viz., the first metric 112) between 90-100% can be easily visually compared with one another, for instance. These devices 102 for the most part are particularly segmented in clusters or groups by different average DNS rates (viz., the second metric 114). However, there are a small number of devices 102 at the far left end that are isolated, and do not have the same average DNS rate as a large number of other devices 102. Such devices 102 may warrant further inspection as potentially having anomalous behavior.

As another example, the plot 122 provides for identification of clusters of similarly behaving devices 102. For example, in the 90-100% bin 118, there are five readily visible clusters of devices 102, in that the light points 206 are organized over five horizontal alignments. In such instance, understanding the behavior of a given device 102 within a cluster may explain the behavior of the other devices 102 within that cluster. Furthermore, in some cases the devices 102 may all serve a common function, such that their membership in the same cluster is appropriate. However, in other cases there may be devices 102 in a cluster that do not serve the same function as the other devices 102, in which case the devices 102 may be indicative of an anomaly.

Figure 3A:
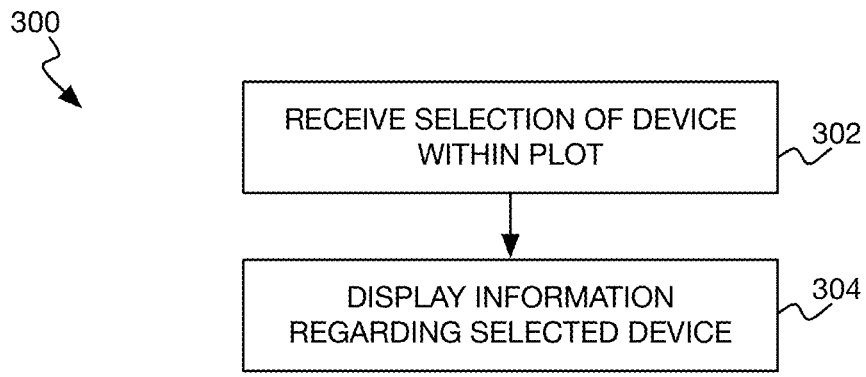
FIG. 3A is a flowchart of an example method for user interaction with the plot of FIG. 2.

FIG. 3A shows an example method 300 of one type of user interaction with the plot 122. The method 300 includes receiving user selection of a particular device 102 (e.g., by selecting or hovering over its light point 206) within the plot 122 (302). The method 300 includes, in response, displaying information regarding the selected device 102 (304). For example, a panel or box may be overlaid on the plot 122, providing the information regarding the selected device 102. The user may select outside of the displayed box (or no longer hover over the box) to cause the box to be removed, and/or may select a different device 102 to cause display of information for that different device 102. In this way, the user is able to glean information of devices 102 of interest to identify those having anomalous behavior.

Figure 3B:
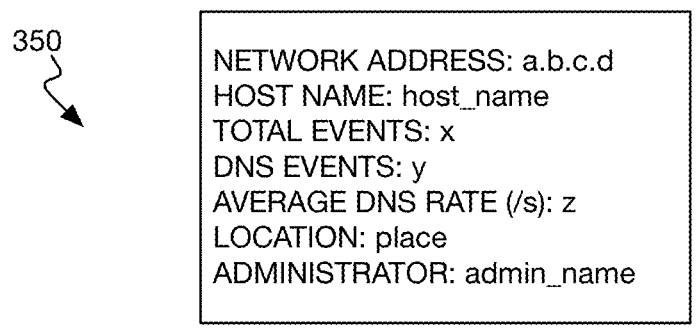
FIG. 3B is a diagram of example such user interaction.

FIG. 3B shows example information 350 that may be displayed in the method 300 of FIG. 3A. For a given device 102, the information 350 that is displayed can include its network address (e.g., Internet protocol (IP) address, media-access controller (MAC) address, and so on) and hostname, as well as the total number of log events 104 pertaining to that device 102 and on which basic the first metric 112 and the second metric 114 were calculated for the device 102. The information 350 can include the number of log events 104 that are DNS events, which is used to compute the first metric 112, and the resulting average DNS rate per second (i.e., the second metric 114). The information 350 can include other types of information as well, such as the location of the device, and the administrator responsible for the device. Still other types of information can include that which is available by looking up the network address or hostname of the device 102 in an inventory list or database.

Figure 4A:
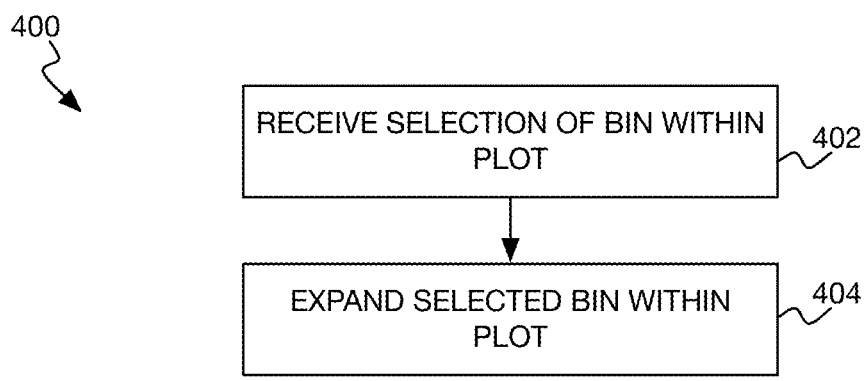
FIG. 4A is a flowchart of another example method for user interaction with the plot of FIG. 2.

FIG. 4A shows an example method 400 of another type of user interaction with the plot 122. The method 400 includes receiving selection of a particular bin 118 (e.g., by selecting a dark point 204 of any device 102 within that bin 118, or by selecting a range of dark points 204 in that bin 118) within the plot 122 (402). The method 400 includes, in response, expanding the selected bin 118 within the plot 122 (404). For example, the plot 122 may effectively be redrawn in real-time so that the selected bin 118 is displayed in detail. In this way, the user is able to inspect different bins 118 in detail, in order to better identify potentially anomalous devices 102 within the bins 118.

Figure 4B:
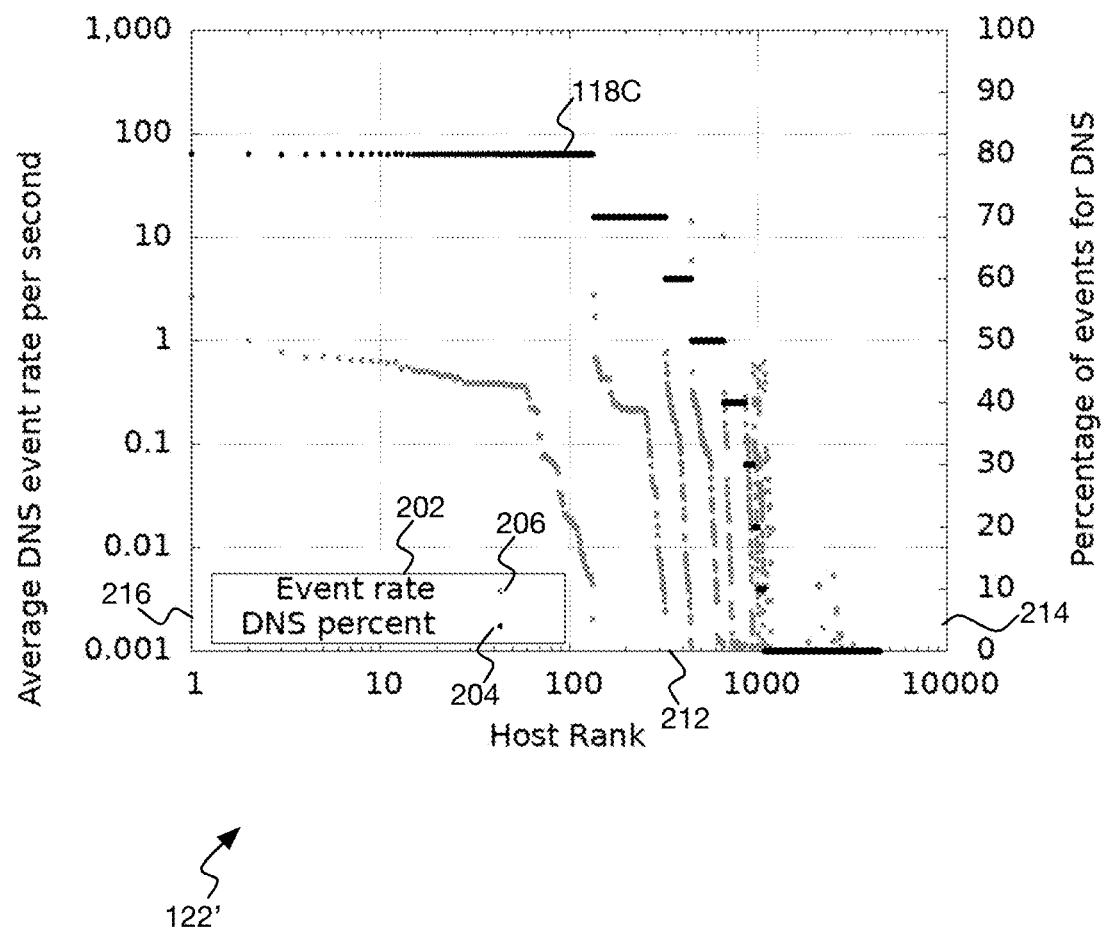
FIG. 4B is a diagram of example such user interaction.

FIG. 4B shows the example resulting plot 122' that may be displayed in the method 400 of FIG. 4A after the user has selected the bin 118C in the plot 122. That is, the plot 122' is the plot 122 of FIG. 2, but expanded to display the devices 102 of the bin 118C in more detail. The devices 102 within the bin 118C, which have a DNS event percentage (viz., the first metric 112) between 70-80% can therefore be more easily visually compared with one another. Because the bin 118C has been expanded in the plot 122', the values of the devices 102 within the bin 118C for the second metric 114 can be more easily compared by their light points 206. The example plot 122' still shows the bins 118 corresponding to the ranges up to and through 70-80%, but in another implementation, just the selected bin 118C corresponding to the range 70-80% may be shown, and no other bins.

Other types of user interaction with the plot 122 may also be provided, in addition to and/or in lieu of those of the methods 300 and 400 of FIGS. 3A and 4B. As one example, a user may filter the devices 102 represented within the plot 122 by points 204 and 206, so that fewer devices 102 are shown in the plot 122. This filtering may be of the same type that can be performed in the process 100 of FIGS. 1A and 1B. Examples of such filtering include by network address range, hostname suffix, or by list of network addresses or hostnames. However, whereas in the process 100 the filtering is performed to limit the number of devices 102 for which the metrics 112 and 114 are computed from the log events 104, in terms of user interaction with the resultantly generated plot 122 filtering is performed after the metrics 112 and 114 have been computed.

The process 100 of FIGS. 1A and 1B can be considered an offline process, because the process 100 is not performed until a plot request is received. That is, the first metric 112 and the second metric 114 are not computed until a request to generate and display the plot 122 is received. This can impede performance, though, since a large amount of log events 104 may have to be processed in order to initially generate the first metric 112 and the second metric 114. By instead performing some of such processing before a plot request is received, the functioning of a computing device (e.g., a computer) can be improved as to its performance in generating a plot when the request is received. In this respect, generation of the plot 122 is said to occur in a partially online manner.

Figure 5A:
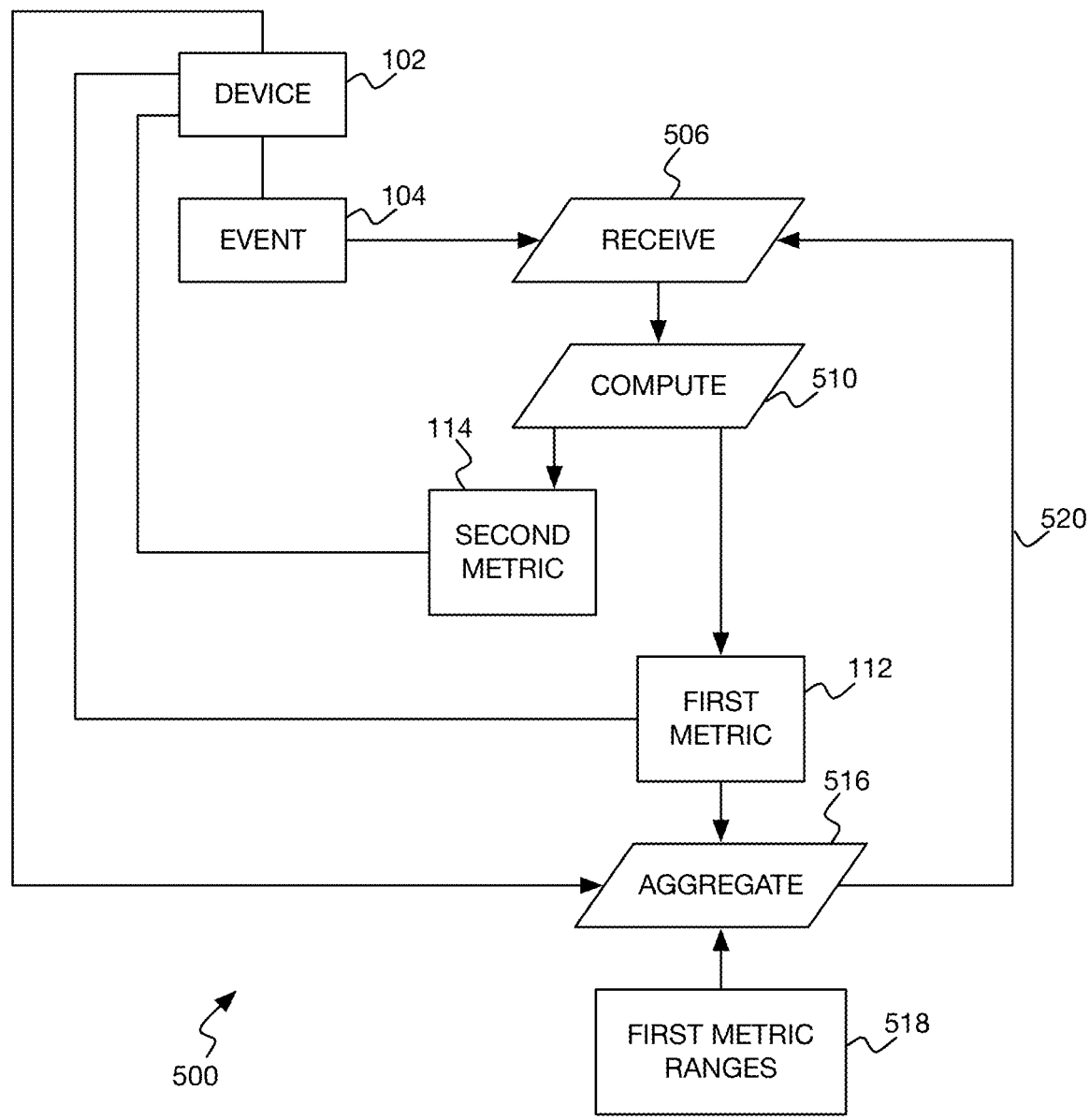
FIGS. 5A and 5B are diagrams of another example process for generating a plot of bins over which devices represented within log events having a power law-oriented distribution are organized.
Figure 5B:
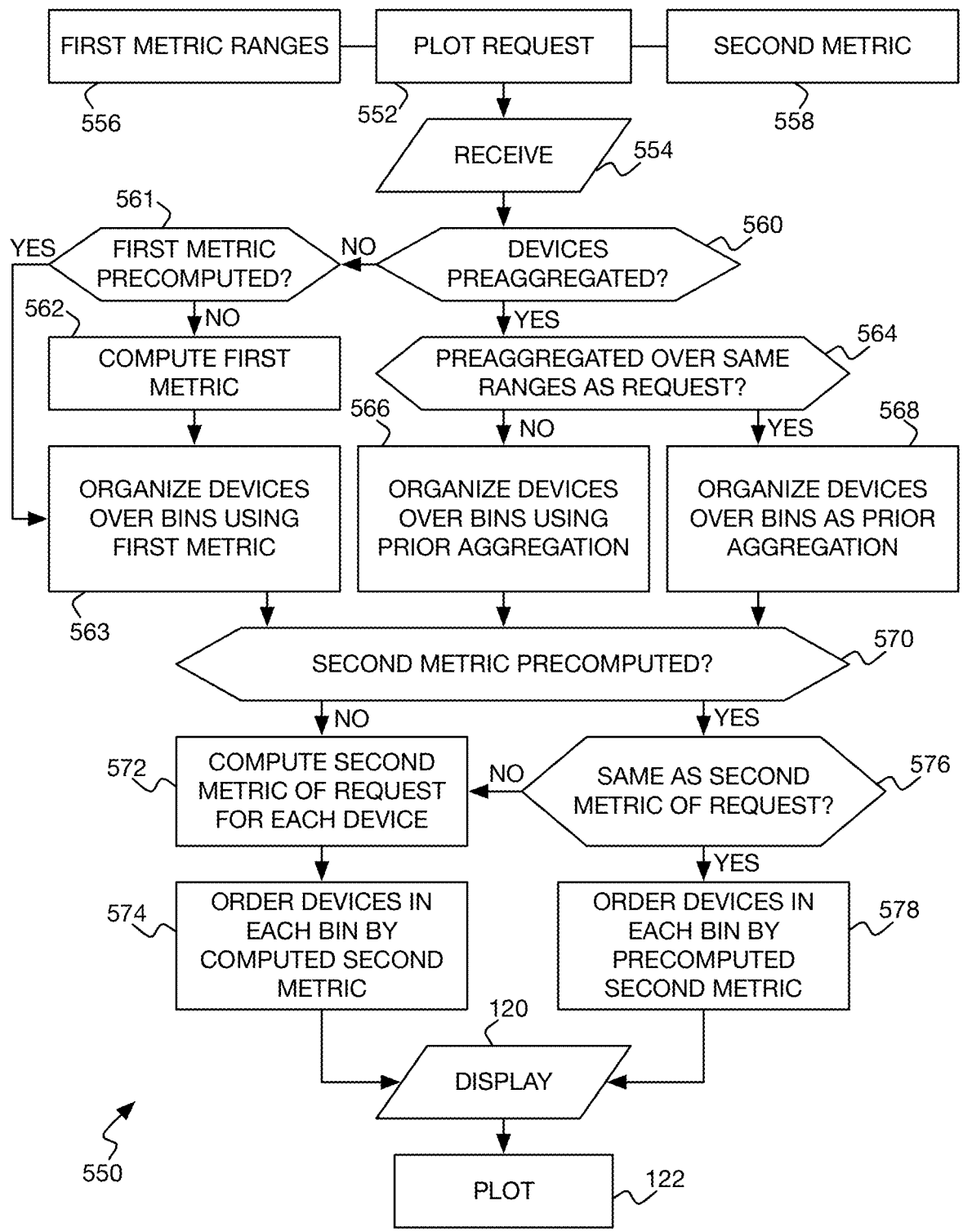

FIGS. 5A and 5B show example processes 500 and 550, respectively, for generating a plot 122 of bins 118 over which devices 102 represented within log events 104 having a power law-oriented distribution are organized. The generation of the plot 122 occurs in a partially online manner, since the process 500 is performed prior to the receipt of a plot request, with the process 550 being performed after a plot request is received. As with the process 100 of FIGS. 1A and 1B, the processes 500 and 550 may be implemented as program code stored on a non-transitory computer-readable data storage medium, and executed by a processor of a computing device to perform processing.

Referring first to FIG. 5A, in the process 500, log events 104 in which devices 102 are represented are received (506). The log events 104 may be received as they are generated, and thus on an individual basis, or may be received periodically in groups. For example, once a number of log events 104 have been generated they may be received (and thus potentially at irregular time intervals), or log events 104 may be periodically received at regular time intervals. In this way, the process 500 can be performed as the log events 104 are individually received, or periodically. The process 500 is performed prior to a receiving a request to generate and display the plot 122.

The first metric 112 and/or the second metric 114 may be computed for each device 102 represented within the log events 104 that have been received (510). Because the metrics 112 and/or 114 are computed prior to receiving a plot request, this means that the metrics 112 do not have to be computed when the plot request is ultimately received. Therefore, the functioning of the computing device in generating the plot 122 once the request to do so is received is improved.

In the case in which the first metric 112 is computed, each device 102 represented within the log events 104 that have been received may also be aggregated based on first metric ranges 518 (516). Such aggregation is similar to the organization of the devices 102 over bins 118 that have been described in relation to the process 100 of FIGS. 1A and 1B. However, the different ranges 518 of the first metric 112 on which basis the devices 102 are aggregated in the process 500 may be more granular than the different ranges on which basis the devices 102 are organized over bins 118.

For instance, an example has been described in which the different ranges of the first metric 112 to which the bins 118 correspond are in ranges of 10%, such as 90-100%, 80-90%, and so on. By comparison, the different first metric ranges 518 on which basis the devices 102 represented within the log events 104 that have been received are aggregated may be more granular. For example, the first metric ranges 518 may be in ranges of 5% (95-100%, 90-95%, and so on), 2% (98-100%, 96-98%, and so on), or 1% (100%, 99%, and so on).

Because the devices 102 are aggregated prior to receiving a plot request, this means that organizing the devices 102 over the bins 118 according to the first metric 112 can occur more quickly, by using the prior aggregation of the devices 102 based on the first metric ranges 518 instead of based on the first metric 112 directly. For example, the bins 118 may correspond to ranges of 90%-100%, 80-90%, and so on, and the first metric ranges 518 may be 95-100%, 90-95%, and so on. Therefore, the devices 102 aggregated based on the two ranges of 95-100% and 90-95% can be organized within the bin 118 corresponding to the range of 90-100%, the devices 102 aggregated based on the two ranges of 85-90% and 80-85% can be organized within the bin corresponding to the range of 80-90%, and so on.

The process 500 is repeated each time one or multiple log events 104 within which devices 102 are represented are received (520). This means that the first metric 112 and/or the second metric 114 for a device 102 is recomputed or updated each time the process 500 is performed in which at least one log event 104 pertaining to the device 102 is received. Similarly, this means that a device 102 may be reaggregated based on the first metric ranges 518 each time the process 500 is performed in which at least one log event 104 pertaining to the device 102 is received.

Referring next to FIG. 5B, the process 550 is performed when a plot request 552 to generate and display the plot 122 is received (554). The plot request 552 may specify first metric ranges 556 to which the bins 118 over which the devices 102 are to be organized correspond. The plot request 552 may additionally or instead specify the second metric 558 on which basis the devices 102 are to be ordered or rank within each bin 118. The plot request 552, in other words, can specify neither the first metric ranges 556 nor the second metric 558, both the first metric ranges 556 and the second metric 558, or either the first metric ranges 556 or the second metric 558.

If the devices 102 have not been preaggregated over the first metric ranges 518 in the process 500 of FIG. 5A (560), and if the first metric 112 has not also been precomputed in the process 500 (561), then the first metric 112 is computed (562) for each device 102 prior to organizing (563) the devices 102 over the bins 118 according to the first metric 112 as so computed. If the devices 102 have not been preaggregated in the process 500 (560), but the first metric 112 has been precomputed in the process 500 (561), then the devices 102 are organized (563) over the bins 118 according to the first metric 112 as precomputed. That is, the first metric 112 for each device 102 does not have to be computed in the process 550 in this case, since it was already computed in the process 500.

If the devices 102 have been preaggregated over the first metric ranges 518 in the process 500 of FIG. 5A (560), however, but if the first metric ranges 518 over which the devices 102 were preaggregated differ from the first metric ranges 556 of the plot request 552 (564), then the devices 102 are organized over the bins 118 using the prior aggregation (566). That is, assuming that the first metric ranges 518 of the preaggregation is more granular than the first metric ranges 556 of the plot request 552, the devices 102 can be organized over the bins 118 by assigning the devices 102 aggregated to multiple first metric ranges 518 to each bin 118, as has been described by example above. This means that the devices 102 can be organized over the bins 118 in the process 500 without having to inspect the first metric 112 for each device 102, since the devices 102 have already been preaggregated over first metric ranges 518.

If the devices 102 have been preaggregated over the first metric ranges 518 in the process 500 of FIG. 5A (560), and the first metric ranges 518 over which the devices 102 were preaggregated are the same as the first metric ranges 556 of the plot request 552 (564), then the devices 102 are organized over the bins 118 as the prior aggregation (568), as opposed to by using the prior aggregation. That is, if the first metric ranges 518 are the same as the first metric ranges 556, then the preaggregation of the devices 102 is already effectively the organization of the devices 102 over the bins 118. For example, if the first metric ranges 518 of the preaggregation and the first metric ranges 556 are both 90-100%, 80-90%, and so on, then the devices 102 preaggregated based on the range 90-100% are organized to the bin 118 corresponding to range 90-100%, the devices preaggregated based on the range 80-90% are organized to the bin 118 corresponding to the range 80-90%, and so on.

Next, if the second metric 114 for each device 102 has not been precomputed in the process 500 of FIG. 5A (570), then the second metric 114 (i.e., the particular second metric 558 specified by the plot request 552) has to be computed (572) in the process 550. The devices 102 within each bin 118 are then ordered (574) or ranked by the second metric 114 as has just been computed. However, even if the second metric 114 for each device 102 has been precomputed in the process 500 (570), the precomputed second metric 114 may be a different metric than the second metric 558 specified by the request 552. In this case (576), the second metric 114 (i.e., the particular second metric 558 specified by the plot request 552) for each device 102 still has to be computed (572) in the process 550 before the devices 102 within each bin 118 are ordered (574) by the second metric 114.

For instance, the second metric 114 for each device 102 that was precomputed in the process 500 of FIG. 5A may be average DNS event rate per second. However, the plot request 552 may specify a different second metric 558, such as average DNS query size or average DNS reply size. In this case, the second metric 114 for each device 102 on which basis the devices 102 within each bin 118 are ordered or ranked has to be computed to be average DNS query or reply size. Just if the second metric 114 has been precomputed in the process 500 of FIG. 5A (570) and is the same as the second metric 558 of the plot request 552 (576) are the devices 102 within each bin 118 ordered (578) or ranked by the second metric 114 as precomputed in the process 500. In this case, then, the second metric 114 for each device 102 does not have to be computed in the process 550.

The plot 122 responsive to the plot request 552 is then displayed (120) in the process 550 as in the process 100 of FIGS. 1A and 1B. However, the process 550 is more performant than the process 100, since the process 550 leverages the prior processing of the process 500 of FIG. 5A. That is, either or both of the first metric 112 and the second metric 114 may not have to be computed in the process 550, unlike in the process 100. Furthermore, organization of the devices 102 over bins 118 can occur more quickly in the process 550 if the devices 102 were preaggregated.

A hybrid of the process 100 and the processes 500 and 550 can also be implemented. For instance, the first metric 112 and/or the second metric 114 may be generated (and/or preaggregation occur) responsive to a first, pre-plot request. Then, when a second, plot request is received, the already generated metrics 112 and/or 114 and/or the preaggregation may be leveraged to generate and display the plot 122 more quickly.

Figure 6A:
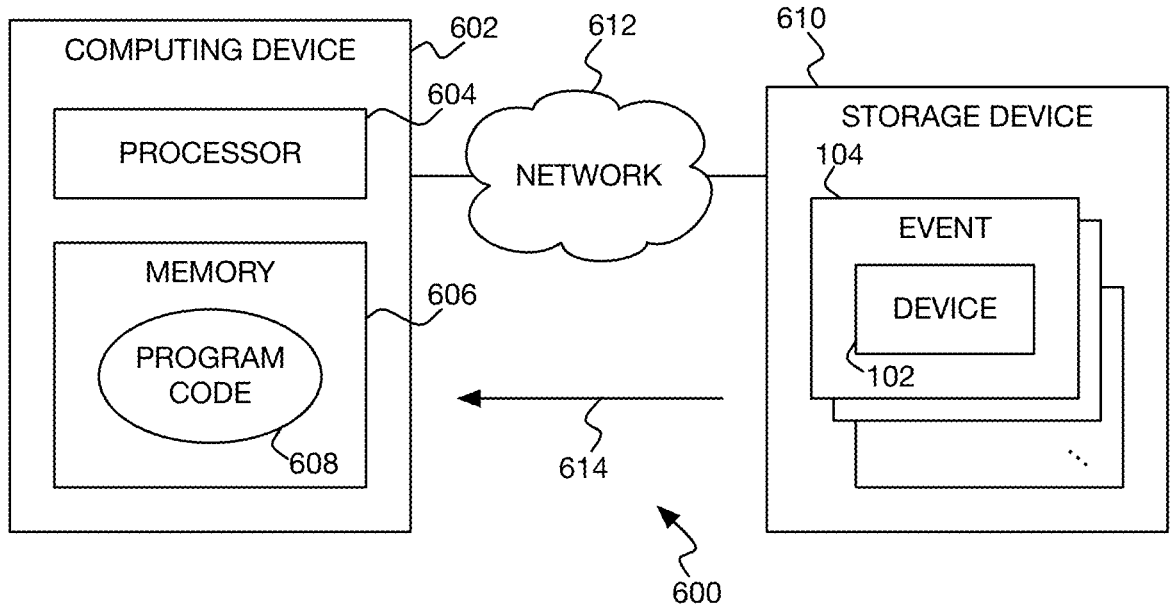
FIGS. 6A and 6B are diagrams of different example systems for generating a plot of bins over which devices represented within log events having a power law-oriented distribution are organized.
Figure 6B:
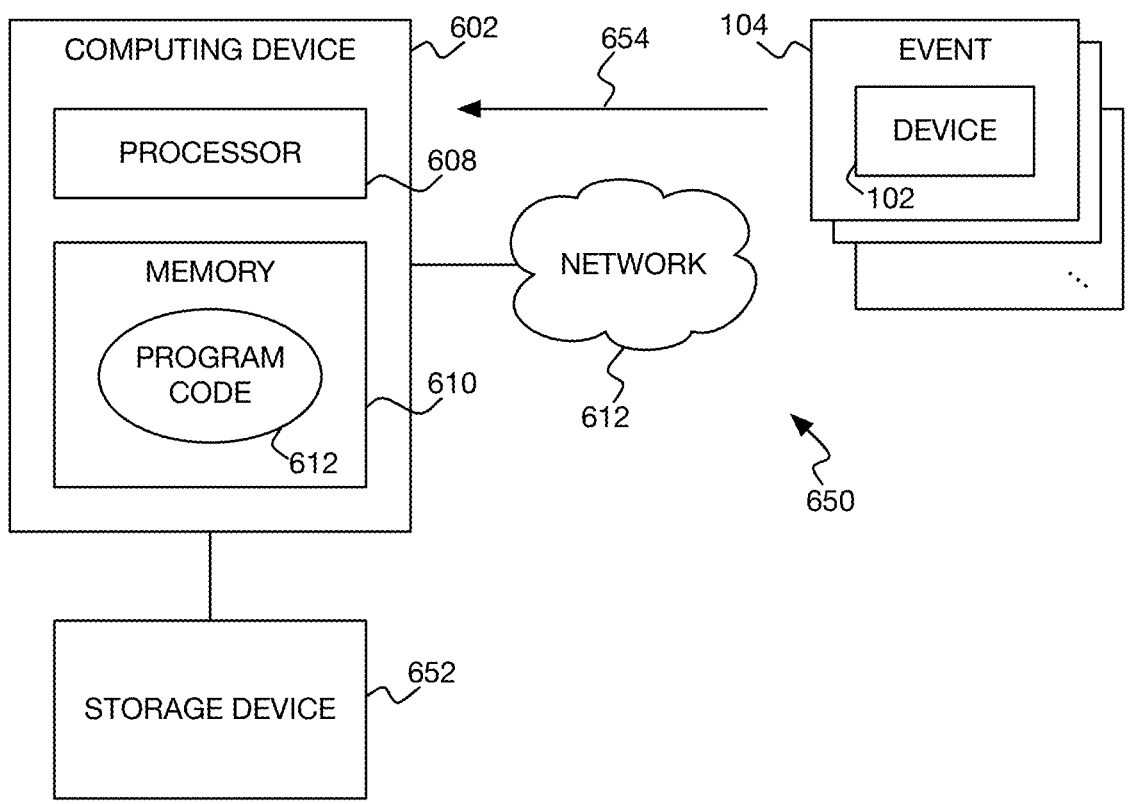

FIGS. 6A and 6B show different example systems 600 and 650, respectively, for generating a plot 122 of bins 118 over which devices 102 represented within log events having a power law-oriented distribution are organized. The systems 600 and 650 each include a computing device 602, such as a desktop or server computing, including a processor 604 and memory 606 storing program code 608 executable by the processor 604 to perform processing. The computing device 602 can be communicatively connected to a network 612.

In FIG. 6A, the system 600 corresponds to the case in which the processing performed by the computing device 602 includes the offline process 100 of FIGS. 1A and 1B. In the example, a storage device 610 that is also communicatively connected to the network 612 may store the log events 104 in which the devices 102 are represented as the events 104 are generated or periodically, without assistance or interaction by the computing device 602. When a plot request is received by the computing device 602, then, the computing device 602 performs the process 100 and thus receives the log events 104 from the storage device 610 over the network 612, per arrow 614, to generate and display the plot 122. The storage device 610 can instead be on the same system or part of the same device 602 that performs the process 100.

By comparison, in FIG. 6B, the system 650 corresponds to the case in which processing performed by the computing device 602 includes the partially online processes 500 and 550 of FIGS. 5A and 5B. In the example, a storage device 652 is directly communicatively connected to the computing device 602, but may instead be communicatively connected to the network 612 as with the storage device 610 of the system 600. The computing device 602 thus receives the log events 104 as the events 104 are generated or periodically, per arrow 654, and stores them in the storage device 652 as part of performing the process 500. The computing device

602 then performs the process 550 when a plot request is received, and can leverage the prior metric computation and/or prior device aggregation performed in the process 500 to generate and display the plot 122. In another implementation, the processes 500 and 550 can be performed by different computing devices.

Techniques have been described for generating a plot 122 of bins 118 over which devices 102 represented within log events 104 having a power law-distribution are organized. The plot 122 aids in identification of devices 102 that have anomalous behavior. For example, such anomalies can include a device 102 that has been subjected to a cyber attack, has been comprised via a security vulnerability, or has been misconfigured. The techniques therefore ensures that actions can be more quickly undertaken to resolve the anomalies.

We claim:

1. A non-transitory computer-readable data storage medium storing program code executable by a processor to perform processing comprising:
   computing, for each item of a plurality of items represented within a plurality of log events having a power law-oriented distribution, first and second metrics for the item based on the log events pertaining to the item;
   organizing the plurality of items over a plurality of bins according to the first metric, the bins corresponding to different ranges of the first metric respectively having representative values;
   for each bin, ordering the plurality of items in the bin according to the second metric; and
   graphically displaying a plot of the bins over which the plurality of items have been organized according to the first metric, including displaying, for each bin, the plurality of items in the bin as have been ordered according to the second metric,
   wherein along an x-axis of the plot, the bins are plotted in order of the different ranges of the first metric to which the bins correspond, and the plurality of items in each bin are plotted in order of the second metric,
   and wherein along a y-axis of the plot, the bins are plotted according to the representative values of the different ranges of the first metric to which the bins correspond, and the plurality of items in each bin are plotted according to values of the plurality of items for the second metric,
   wherein in the graphically displayed plot, each item has a corresponding first point for the first metric and a corresponding second point for the second metric.

2. The non-transitory computer-readable data storage medium of claim 1, wherein the plurality of items are devices, and the processing further comprises:
   identifying one of the plurality of items within the plot that has an anomaly; and
   performing an action relative to the identified one of the plurality of items to resolve the anomaly.

3. The non-transitory computer-readable data storage medium of claim 1, wherein the processing further comprises:
   receiving selection of one of the plurality of items within the plot; and
   displaying information regarding the one of the plurality of items that has been selected.

4. The non-transitory computer-readable data storage medium of claim 1, wherein the processing further comprises:
   receiving selection of one of the bins within the plot; and
   expanding the one of the bins that has been selected within graphical display of the plot.

5. The non-transitory computer-readable data storage medium of claim 1, wherein the processing further comprises:
   filtering the log events prior to graphically displaying the plot, such that the plurality of items denoted within the plot are a subset of all the plurality of items represented within the log events.

6. The non-transitory computer-readable data storage medium of claim 1, wherein the corresponding representative values of each the different ranges are each a minimum value or a maximum value of the respective different range.

7. The non-transitory computer-readable data storage medium of claim 1, wherein the x-axis is logarithmic.

8. A system comprising:
   a processor; and
   a memory storing program code executable by the processor to:
     receive a plurality of log events having a power law-oriented distribution, wherein a plurality of items are represented within the log events;
     prior to receiving a plot request, compute a first metric for each item and aggregating each item based on ranges of the first metric;
     in response to receiving the plot request, organize the items over a plurality of bins according to the first metric, the bins corresponding to different ranges of the first metric specified within the plot request, wherein the different ranges are larger than the ranges on which basis each item has been aggregated;
     for each bin, order the items in the bin according to a second metric; and
     graphically display a plot of the bins, including displaying, for each bin, the items in the bin as have been ordered according to the second metric,
   wherein in the graphically displayed plot, each item has a corresponding first point for the first metric and a corresponding second point for the second metric,
   wherein the bins are plotted along an x-axis of the plot in order of the different ranges of the first metric to which the bins correspond,
   wherein the bins are plotted along an y-axis of the plot according to representative values of the different ranges of the first metric to which the bins correspond, where each different range has a corresponding representative value,
   wherein, for each bin, the items in the bin are plotted along the x-axis of the plot in order of the second metric,
   and wherein, for each bin, the items in the bin are plotted along the y-axis of the plot according to values of the items for the second metric.

9. The system of claim 8, wherein the items are organized over the bins according to the first metric using prior aggregation of each item based on the ranges of the first metric.

10. The system of claim 8, wherein the program code is executable by the processor to further:
    prior to receiving the plot request, compute the second metric for each item, such that the second metric does not have to be computed responsive to receiving the plot request.

11. The system of claim 8, wherein the program code is executable by the processor to further:

in response to receiving the plot request, for each item, compute the second metric that is specified in the plot request.

12. A method comprising:

receiving, by a processor, a plurality of log events having a power law-oriented distribution, wherein a plurality of items are represented within the log events;

prior to receiving a plot request, computing, by the processor, first and second metrics for each item;

in response to receiving the plot request, organizing, by the processor, the items over a plurality of bins according to the first metric, the bins corresponding to different ranges of the first metric;

for each bin, ordering, by the processor, the items in the bin according to the second metric; and graphically displaying, by the processor, a plot of the bins, including displaying, for each bin, the items in the bin as have been ordered according to the second metric, wherein in the graphically displayed plot, each item has a corresponding first point for the first metric and a corresponding second point for the second metric, wherein the bins are plotted along an x-axis of the plot in order of the different ranges of the first metric to which the bins correspond, wherein the bins are plotted along a y-axis of the plot according to representative values of the different ranges of the first metric to which the bins correspond, where each different range has a corresponding representative value, wherein, for each bin, the items in the bin are plotted along the x-axis of the plot in order of the second metric, and wherein, for each bin, the items in the bin are plotted along the y-axis of the plot according to values of the items for the second metric.

13. The method of claim 12, wherein the items are organized over the bins according to the first metric using prior computation of the first metric for each item, and wherein, for each bin, the plurality of items are ordered in the bin according the second metric using prior computation of the second metric for each item.

\* \* \* \* \*